April 6, 1943.                L. MOHR                2,316,097
                              PLOW SHARE
                          Filed Aug. 22, 1940
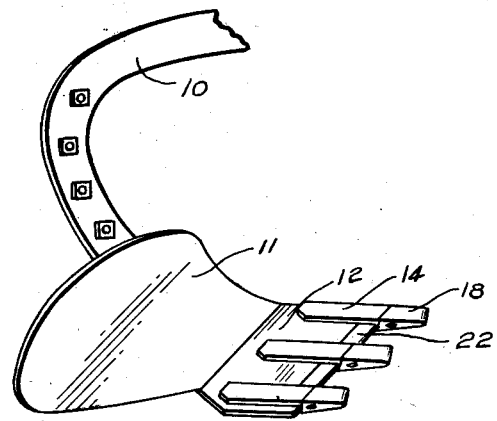
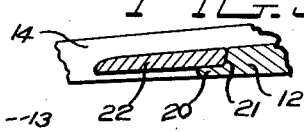
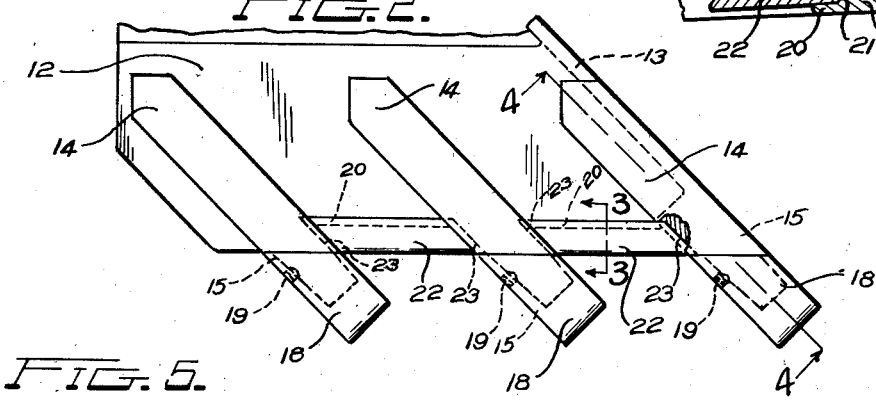
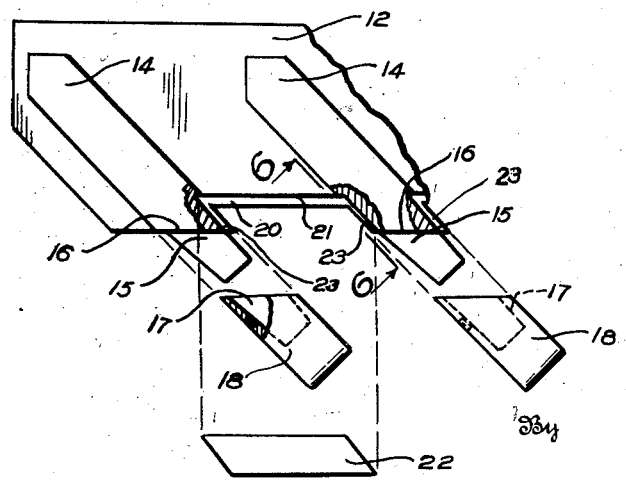
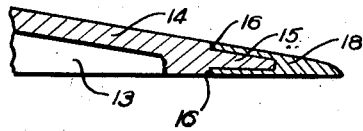
Inventor
Lloyd Mohr
By Malcolm W. Fraser
Attorney Patented Apr. 6, 1943

2,316,097

UNITED STATES PATENT OFFICE 2,316,097

PLOWSHARE

Lloyd Mohr, Swanton, Ohio, assignor to Raymond V. Pilliod, Swanton, Ohio

Application August 22, 1940, Serial No. 353,719

3 Claims. (Cl. 97—125)

This invention relates to a plowing device but more particularly to plow share construction.

An object is to produce a new and improved plow share equipped with detachable rooter teeth.

Another object is to produce a plow share having replaceable rooter teeth and cutter strips.

A further object is to produce a plowing device having the new and improved features of construction and arrangement hereinafter described.

For purposes of illustration but not of limitation, an embodiment of the invention is shown on the accompanying drawing, in which Figure 1 is a perspective view of a plowing device, showing particularly a share having detachable teeth and cutting strips;

Figure 2 is a fragmentary enlarged view of the plow share showing its parts in assembled relation;

Figure 3 is an enlarged fragmentary section taken on the line 3—3 of Figure 2;

Figure 4 is a section taken on the line 4—4 of Figure 2;

Figure 5 is an enlarged fragmentary view of the plow share showing particularly the way in which the detachable teeth and cutting strips are mounted on the plow share; and Figure 6 is a section taken on the line 6—6 of Figure 5.

Referring to the drawing, the supporting arm 10 carries a mold-board 11 and plow share 12, in the form of a metal plate and including a landside 13, as is well-known to those skilled in the art.

Formed integrally with said share or plate 12 and spaced equally from each other along the share is a series of forwardly inclined ribs 14. The number and spacing of the ribs 14 may be varied as desired without essentially affecting the features of the invention. These inclined ribs 14 project forwardly beyond the forward edge of the plate 12 in tapered extensions or posts 15 which are rectangular in cross section and form shoulders 16 at their junction with the ribs 14. These tapered extensions 15 are adapted to form an intimate frictional or wedging fit with the tapered walls of sockets 17 in the detachable cast metal teeth 18 when the teeth 18 are mounted on the extensions 15 in abutment with the shoulders 16. Set screws 19 may be employed if desired positively to hold the teeth 18 in place.

A relatively thin extension 20 on the leading edge of the share 12 forms an external shoulder 21 against which the detachable metal cutting strips 22 abut so that the upper surfaces of the strips 22 are substantially flush with the outer surface of the share 12. The strips 22 are secured at each end against longitudinal or transverse motion. As shown in Figure 2, each strip 22 is secured against longitudinal or transverse motion by having both of its ends disposed in shallow grooves 23 formed in the sides of ribs 14. The strips 22 are held against any outward movement by the teeth 18 which abut against the shoulders 16 to close the open or outward end of the grooves 23.

In the event of wear, or for other purposes, the teeth and cutting strips may be removed and replaced by others, thus eliminating the necessity of replacing the whole share and thereby reducing the maintenance cost of the device. The teeth 18 are removed by loosening the set screws 19 and knocking said teeth from engagement with the extensions 15. Removal of the strips 22 can be accomplished only after removal of the teeth 18 which hold them in place.

During the operation of the plowing device, the teeth 18 extend relatively deeply into the earth while the cutting strips 22 cut through the surface portion of the soil. The ribs 14 and mold-board 11 break up and turn over the soil which has been cut loose by the teeth 18.

The invention derives its importance from the simple construction which is employed for mounting and securing the detachable metal teeth and cutting strips in position in such a way that they are rigid and yet they may be removed for replacement without any difficulty. Since these parts which are subject to wear may be easily replaced, it is not necessary to replace the whole share and the cost of maintaining the share in operation is slight.

It is to be understood that changes in details of construction and arrangement may be effected without departing from the spirit of the invention especially as defined in the appended claims.

What I claim is:

1. In a plowing device having a plow share, said plow share comprising a plate, a series of ribs integral with said plate, a corresponding series of detachable teeth adapted to form an intimate fit with the outer end of said ribs so that said teeth form substantially a continuation of said ribs, said ribs having grooves in the sides thereof, replaceable cutting strips disposed between said ribs, the ends of said cutting strips projecting into said grooves to secure said replaceable strips in position, removal of said strips being facilitated upon displacement of said teeth and the forward edges of said cutting strips being adjacent the inner edges of said teeth whereby the ends of the grooves prevent movement of the strips in longitudinal directions and the teeth prevent movement thereof in a lateral direction.

2. In a plowing device having a plow share, said plow share comprising a plate, replaceable cutting strips disposed along the forward edge of said plate, a thin extension on the forward edge of said plate forming a shoulder against which said cutting strips abut placing the upper surfaces of said strips in a position substantially flush with the surface of said plate, detachable teeth at opposite ends of said cutting strips, and means integral with said plate for preventing longitudinal or transverse motion of said detachable strips.

3. In a plowing device having a plow share, said plow share comprising a plate, a series of ribs on said plate, a corresponding series of detachable teeth each having a tapered socket portion therein, tapered extensions on said ribs terminating at shoulders against which the detachable teeth abut when positioned on said tapered extensions, replaceable cutting strips disposed along the forward edge of said plate between adjacent ribs, a thin extension on the forward edge of said plate forming a shoulder against which said cutting strips abut placing the upper surfaces of said strips in a position substantially flush with the surface of said plate, and means holding said cutting strips against movement.

LLOYD MOHR.